United States Patent
Ahmed et al.

(10) Patent No.: US 10,095,406 B2
(45) Date of Patent: Oct. 9, 2018

(54) CASCADED TOUCH TO WAKE FOR SPLIT ARCHITECTURE

(71) Applicant: QUALCOMM Incorporated, San Diego, CA (US)

(72) Inventors: Mohamed Imtiaz Ahmed, San Marcos, CA (US); Magdi Abuelgasim Mohamed, San Diego, CA (US); Xin Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/272,354

(22) Filed: Sep. 21, 2016

(65) Prior Publication Data

US 2017/0177207 A1     Jun. 22, 2017

Related U.S. Application Data

(60) Provisional application No. 62/269,707, filed on Dec. 18, 2015.

(51) Int. Cl.
*G06F 3/00* (2006.01)
*G06F 3/0488* (2013.01)
(Continued)

(52) U.S. Cl.
CPC ........ *G06F 3/04883* (2013.01); *G06F 1/3206* (2013.01); *G06F 1/3215* (2013.01);
(Continued)

(58) Field of Classification Search
CPC .. G06F 3/04883; G06F 3/04886; G06F 3/041; G06F 1/3215; G06F 1/3262; G06F 1/3206; Y02D 50/20
See application file for complete search history.

(56) References Cited

U.S. PATENT DOCUMENTS 9,058,078 B2   6/2015  Weaver et al.
9,086,749 B2   7/2015  Pourbigharaz et al.
(Continued)

FOREIGN PATENT DOCUMENTS

EP       2479642 A1    7/2012

OTHER PUBLICATIONS

International Search Report and Written Opinion—PCT/US2016/062914—ISA/EPO—dated Feb. 8, 2017.

*Primary Examiner* — Muhammad N Edun
(74) *Attorney, Agent, or Firm* — Kilpatrick Townsend & Stockton, LLP

(57) ABSTRACT

Aspects of the disclosure are related to a touch controller for use in a device having a processor and a touch sensor panel, the touch controller being coupled to the processor and the touch sensor panel, and further comprising: an analog front-end (AFE), wherein the AFE is configured to generate raw touch image data based on electrical signals generated by the touch sensor panel in response to one or more detected touches thereto; a coarse processing element configured to, in response to the processor being set to a sleep mode, coarsely process the raw touch image data to generate sparse data; and an embedded memory configured to store at least the sparse data, wherein the touch controller is configured to transmit a signal to the processor to wake the processor up and transmit the stored sparse data and new touch image data to the processor, wherein the processor performs gesture recognition based on the sparse data and the new touch image data.

30 Claims, 5 Drawing Sheets

(51) Int. Cl.
*G06F 3/041* (2006.01)
*G06F 1/32* (2006.01)

(52) U.S. Cl.
CPC .......... *G06F 1/3262* (2013.01); *G06F 3/0416* (2013.01); *G06F 3/04886* (2013.01); *Y02D 50/20* (2018.01)

(56) References Cited

U.S. PATENT DOCUMENTS

| | | |
|---|---|---|
| 2013/0290761 A1 | 10/2013 | Moon et al. |
| 2014/0160085 A1 | 6/2014 | Rabii et al. |
| 2014/0191991 A1 | 7/2014 | Flowers et al. |
| 2017/0102758 A1* | 4/2017 | Siaw ................... G06F 3/04883 |

* cited by examiner

FIG. 1A
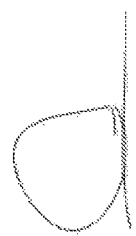  
FIG. 1B     FIG. 1C
   
FIG. 1D     FIG. 1E

500 ⤴

600 ⤴

CASCADED TOUCH TO WAKE FOR SPLIT ARCHITECTURE

CROSS-REFERENCE TO RELATED APPLICATIONS

The present application claims the benefit of U.S. Provisional Application No. 62/269,707 entitled "CASCADED TOUCH TO WAKE FOR SPLIT ARCHITECTURE" filed Dec. 18, 2015.

FIELD

The subject matter disclosed herein relates, in general, to electronic devices, and in particular, to an apparatus, system, and method for coarsely processing raw touch image data at a touch processor to enable cascaded touch to wake.

BACKGROUNDS

The touchscreen has become an indispensable component in more and more electronic devices such as smartphones and tablets. In a traditional architecture, a touch controller comprising an analog front-end (AFE) and a digital signal processor (DSP) is utilized as an intermediary between a touch sensor panel and a processor (e.g., a System on Chip "SoC"). The traditional touch controller may convert electrical signals generated by the touch sensor panel in response to detected touches thereto into digital signals and extract two-dimensional (e.g., x, y) coordinates associated with the touches from the digital signals. Further, the traditional touch controller may transmit the two-dimensional coordinates to the processor via a suitable interface.

An improvement upon the traditional architecture is known as the split architecture. In the split architecture, the touch controller is simplified. The simplified touch controller may comprise only an AFE, and may be capable of generating digital raw touch image data based on electrical signals generated by the touch sensor panel in response to detected touches thereto and transmitting the raw touch image to the processor via a suitable interface. Further processing of the raw touch image, such as the extraction of coordinates from the raw touch image, may be performed by the processor.

The split architecture has several advantages. For example, in the split architecture, existing hardware of the processor may be leveraged to perform functions that are performed by the DSP in the traditional architecture, thereby simplifying the touch controller and lowering the cost. Moreover, using the processor to process the raw touch image may allow for the use of more advanced algorithms and therefore may enable more sophisticated feature or functionality not possible with the traditional touch controller.

One drawback of the split architecture relates to a touchscreen-enabled function known as "touch to wake." With touch to wake, the user may predefine gestures or symbols (referred to collectively as "gestures" hereinafter), e.g., patterns to be drawn on the touchscreen, that, when detected at the touchscreen, cause the device to wake up, unlock, and/or perform a particular predefined task (e.g., launch a particular application). Multiple gestures may be defined, and each gesture may be associated with a particular operation (e.g., wake up, unlock, perform a task, etc.). A gesture may be as simple as a letter drawn on the touchscreen.

With the traditional architecture, the touch controller may be capable of independently determining whether a drawing of a gesture is being attempted at the touch sensor panel without involving the processor. If the processor is in a sleep mode, the touch controller may still be able to independently determine whether a drawing of a gesture is being attempted, and once the touch controller positively determines that a drawing of a gesture is being attempted, it may transmit a signal to the processor to wake the processor up.

With the split architecture, however, the simplified touch controller may lack the ability to independently determine whether a drawing of a gesture is being attempted at the touch sensor panel. The determination may have to be made by the processor. Therefore, if the processor is in a sleep mode, once any touch starts occurring, the simplified touch controller would have to wake the processor up before its embedded memory is filled up by the raw touch image frames, which happens very soon due to the size of the embedded memory and of the raw touch image frames (e.g., a raw touch image frame with a resolution of 64×40 may take up more than 5 kilobytes (kB) of storage space), or risk losing the raw touch image frames corresponding to the initial portions of a gesture. Neither alternative is desirable. The waking up of the processor may ultimately prove unnecessary as a result of, e.g., the touches being accidental and not constituting a gesture, in which case precious battery energy would have been wasted on waking the processor up from the sleep mode. On the other hand, losing the raw touch image frames corresponding to potentially the initial portions of a gesture may reduce the accuracy of the result of gesture recognition, especially for complex gestures. Algorithms for extrapolating the missing portions of a gesture from the known portions are known, but the results can be inaccurate. Nor is increasing the embedded memory of the touch controller desirable as it may be too costly.

SUMMARY

An aspect of the disclosure is related to a touch controller for use in a device having a processor and a touch sensor panel, the touch controller being coupled to the processor and the touch sensor panel, and further comprising: an analog front-end (AFE), wherein the AFE is configured to generate raw touch image data based on electrical signals generated by the touch sensor panel in response to one or more detected touches thereto; a coarse processing element configured to, in response to the processor being set to a sleep mode, coarsely process the raw touch image data to generate sparse data; and an embedded memory configured to store at least the sparse data, wherein the touch controller is configured to transmit a signal to the processor to wake the processor up and transmit the stored sparse data and new touch image data to the processor, wherein the processor performs gesture recognition based on the sparse data and the new touch image data.

Another aspect of the disclosure is related to a method for coarsely processing raw touch image data, comprising: generating at an analog front-end (AFE) of a touch controller raw touch image data based on electrical signals generated by a touch sensor panel in response to one or more detected touches thereto; in response to a processor being set to a sleep mode, coarsely processing the raw touch image data at a coarse processing element of the touch controller to generate sparse data, storing the sparse data in an embedded memory of the touch controller; transmitting a signal to the processor to wake the processor up; and transmitting the stored sparse data and new touch image data to the processor, wherein the processor performs gesture recognition based on the sparse data and the new touch image data.

Yet another aspect of the disclosure is related to an apparatus for coarsely processing raw touch image data, comprising: means for generating raw touch image data based on electrical signals generated by a touch sensor panel in response to one or more detected touches thereto; means for in response to a processor being set to a sleep mode, coarsely processing the raw touch image data to generate sparse data; means for storing the sparse data in an embedded memory of the touch controller; means for transmitting a signal to the processor to wake the processor up; and means for transmitting the stored sparse data and new touch image data to the processor, wherein the processor performs gesture recognition based on the sparse data and the new touch image data.

Still another aspect of the disclosure is related to a non-transitory computer-readable medium comprising code which, when executed by a processor, causes the processor to perform a method comprising: generating at an analog front-end (AFE) of a touch controller raw touch image data based on electrical signals generated by a touch sensor panel in response to one or more detected touches thereto; in response to a processor being set to a sleep mode, coarsely processing the raw touch image data at a coarse processing element of the touch controller to generate sparse data; storing the sparse data in an embedded memory of the touch controller; transmitting a signal to the processor to wake the processor up; and transmitting the stored sparse data and new touch image data to the processor, wherein the processor performs gesture recognition based on the sparse data and the new touch image data.

BRIEF DESCRIPTION OF THE DRAWINGS

FIGS. 1A-1E are example diagrams illustrating gesture recognition confusion as a result of lost initial portions.

DETAILED DESCRIPTION

Figure 2:
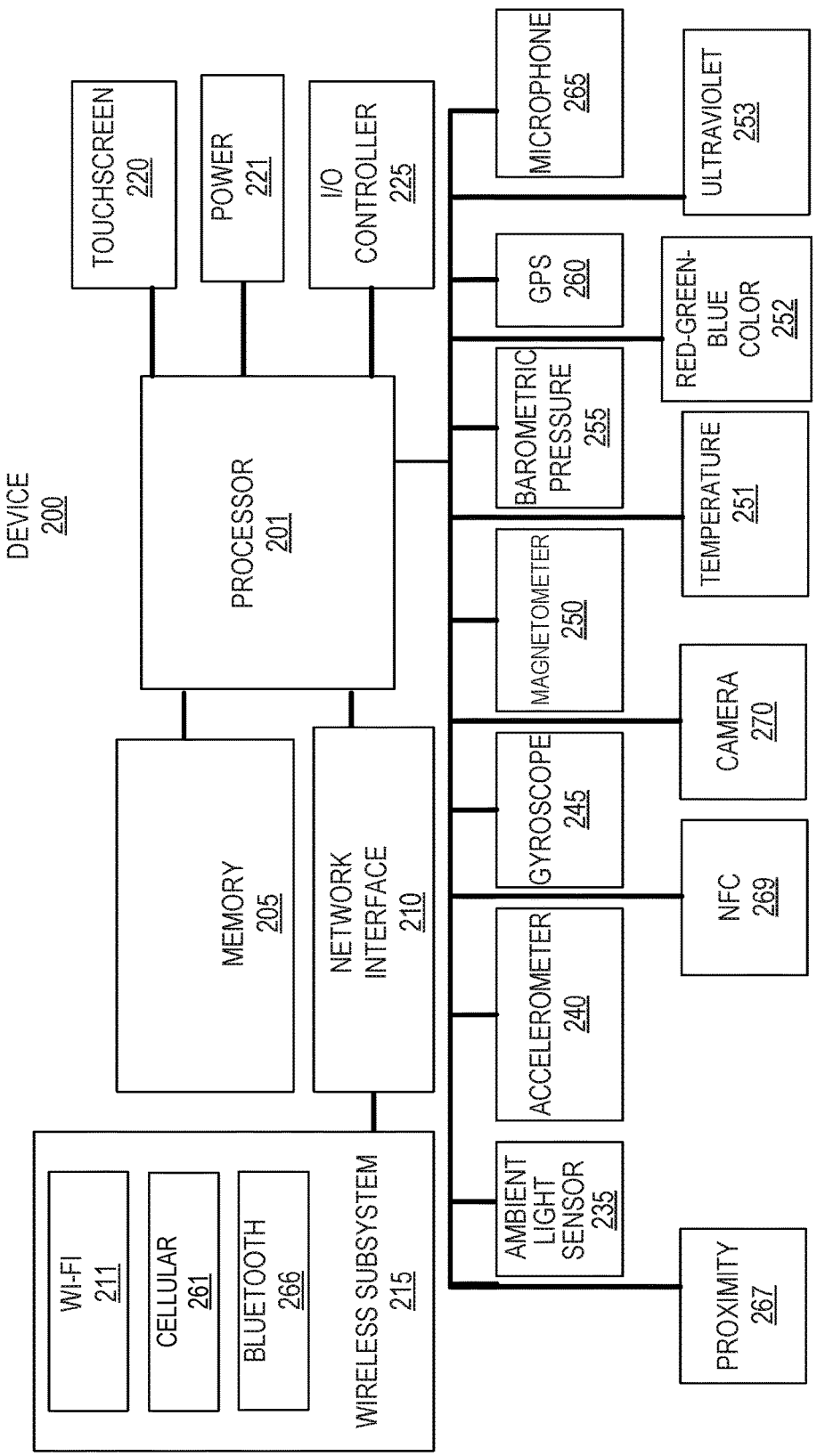
FIG. 2 is block diagram illustrating an exemplary device in which embodiments of the disclosure may be practiced.

Aspects of the disclosure are disclosed in the following description and related drawings directed to specific embodiments of the disclosure. Alternate embodiments may be devised without departing from the scope of the disclosure. Additionally, well known elements of the disclosure may not be described in detail or may be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring to FIGS. 1A-1E, example diagrams 100A-E illustrating gesture recognition confusion as a result of lost initial portions are shown. FIG. 1A shows that an intended gesture of the lower-case letter "a" may be mistakenly recognized as the lower-case letter "o" when some portions of the intended gesture is lost. Similarly, FIG. 1B shows that an intended gesture of the lower-case letter "d" may be mistakenly recognized as the upper-case letter "J"; FIG. 10 shows that an intended gesture of the lower-case letter "g" may be mistakenly recognized as the lower-case letter "y"; FIG. 1D shows that an intended gesture of the lower-case letter "o" may be mistakenly recognized as the lower-case letter "c"; and FIG. 1E shows that an intended gesture of the lower-case letter "e" may be mistakenly recognized as the lower-case letter "c."

Embodiments of the disclosure relate to a system, apparatus, and method for coarsely processing the raw touch image data within a touch controller. In particular, the operations include generating raw touch image data based on electrical signals generated by a touch sensor panel in response to detected touches thereto, coarsely processing the raw touch image data within a touch controller to generate sparse data (the sparse data being the results of the coarse processing) in response to a processor (e.g., an SoC) being set to a sleep mode, storing the sparse data in an embedded memory of the touch controller, transmitting a signal to the processor in the sleep mode to wake the processor up, and transmitting the stored sparse data and incoming touch image data generated after the waking up of the processor (which may be referred to as "new touch image data" hereinafter) to the processor, wherein the processor may perform gesture recognition based on the received sparse data and the new touch image data. The raw touch image data may comprise data generated in the self-capacitance and/or the mutual capacitance mode. The touch controller may wake the processor up when one or more conditions are met. The conditions may be, for example, that a predefined time has passed since a detection of a first touch, or that the accumulated sparse data has reached a threshold size, or that an estimated probability that a gesture is being drawn by a user is above a threshold. The probability that a gesture is being drawn may be estimated by the touch controller (e.g., more particularly, by the coarse processing element) based on one or more of: a curvature of a touch segment, a length of a touch segment (e.g., a longer length may indicate a higher probability of a gesture), a location of a touch, a duration of a touch (e.g., a longer duration may indicate a higher probability of a gesture), a fractal dimension of captured signals (a fractal dimension is a ratio providing a statistical index of complexity comparing how detail in a pattern (strictly speaking, a fractal pattern) changes with the scale at which it is measured), etc., or any combination thereof. Therefore, the touch controller may wake the processor up when a gesture has been partially drawn by a user. The foregoing list of conditions is not exhaustive, and does not limit the disclosure. Once the processor is woken up, the touch controller may disable the coarse processing of the raw touch image data and start transmitting touch data that has a higher quality than the sparse data, such as the raw touch image data, for new touches, to the processor. The waking up of the processor may be indicated by a user-perceptible event, such as a screen display change (e.g., lighting up), an audio/sound notification, or a haptic feedback, etc. The new touch image data transmitted to the processor may be new raw touch image data, or may be derived at the touch controller from the new raw touch image data. In one embodiment, operations performed in the touch controller may further comprise determining a stroke length, a curve, a finger presence, or a finger size (area, volume, eccentricity, etc.), etc.

The sparse data may be any data that is small in size but can be utilized by the processor to at least partially reconstruct the portions of a potential gesture that were drawn before the waking up of the processor. Different methods for generating the sparse data have been contemplated without deviating from the scope of the disclosure. Because the sparse data is small in size compared to the corresponding raw touch image data, storing the sparse data in the embedded memory of the touch controller as opposed to the raw touch image frames allows for the storing of data that corresponds to a longer period of time, without an increase in the size of the embedded memory. Therefore, storing the sparse data in the embedded memory of the touch controller allows for delayed waking up of the processor, thereby preserving battery energy. Moreover, because the sparse data can be utilized by the processor to at least partially reconstruct the portions of a potential gesture that were drawn before the waking up of the processor, the raw touch image data generated when the processor is in the sleep mode may be safely discarded, and the decrease in gesture recognition accuracy as a result of the lost raw touch image data can be minimized.

In one embodiment, the sparse data may be two-dimensional coordinates with associated identifiers for the touches. The identifiers help maintain a relative sequence in time of the touches. Therefore, the identifiers may be index numbers, timestamps, etc. In another embodiment, the sparse data may be the locations of blob regions (the blob regions being regions where touches are detected). In one embodiment, the sparse data may comprise or be based on self-capacitance data.

Methods for estimating at the touch controller a probability that a gesture is being drawn by a user based on incoming raw touch image data and/or sparse data may be utilized. In one embodiment, patterns such as curves or straight lines and/or measures such as a duration of contiguous line draws may be searched for and utilized in the estimation of the probability that a gesture is being drawn by the user. In other words, the probability that a gesture is being drawn may be estimated by the touch controller (e.g., more particularly, by the coarse processing element) based on one or more of: a curvature of a touch segment, a length of a touch segment (e.g., a longer length may indicate a higher probability of a gesture), a location of a touch, a duration of a touch (e.g., a longer duration may indicate a higher probability of a gesture), a fractal dimension of captured signals, etc., or any combination thereof.

FIG. 2 is block diagram illustrating an exemplary device 200 in which embodiments of the disclosure may be practiced. The device 200 may include one or more processors 201, a memory 205, I/O controller 225, and network interface 210. Device 200 may also include a number of device sensors coupled to one or more buses or signal lines further coupled to the processor 201. It should be appreciated that device 200 may also include a touchscreen 220, a user interface (e.g., keyboard or similar devices), a power device 221 (e.g., a battery), as well as other components typically associated with electronic devices. In some embodiments, device 200 may be a mobile or non-mobile device. Herein "processor" and "data processing unit" are used interchangeably.

The device (e.g., device 200) can include sensors such as ambient light sensor (ALS) 235, accelerometer 240, gyroscope 245, magnetometer 250, temperature sensor 251, barometric pressure sensor 255, red-green-blue (RGB) color sensor 252, ultra-violet (UV) sensor 253, UV-A sensor, UV-B sensor, compass, proximity sensor 267, near field communication (NFC) 269, and/or Global Positioning System (GPS) sensor 260. In some embodiments, other sensors may also have multiple installations or versions.

Memory 205 may be coupled to processor 201 to store instructions for execution by processor 201. In some embodiments, memory 205 is non-transitory. Memory 205 may also store one or more models or modules to implement embodiments described below. Memory 205 may also store data from integrated or external sensors.

Network interface 210 may also be coupled to a number of wireless subsystems 215 (e.g., Bluetooth 266, Wi-Fi 211, Cellular 261, or other networks) to transmit and receive data streams through a wireless link to/from a wireless network, or may be a wired interface for direct connection to networks (e.g., the Internet, Ethernet, or other wired or wireless systems). The mobile device may include one or more local area network transceivers connected to one or more antennas. The local area network transceiver comprises suitable devices, hardware, and/or software for communicating with and/or detecting signals to/from wireless APs, and/or directly with other wireless devices within a network. In one aspect, the local area network transceiver may comprise a Wi-Fi (802.11x) communication system suitable for communicating with one or more wireless access points.

The device 200 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, LTE Advanced, WCDMA, UMTS, 4G, 5G, or GSM. Additionally, any other type of wireless networking technologies may be used, for example, WiMAX (802.16), Ultra Wide Band, ZigBee, wireless USB, etc.

Thus, device 200 may be a: mobile device, wireless device, cell phone, personal digital assistant, mobile computer, wearable device (e.g., head mounted display, virtual reality glasses, etc.), robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 200 may include a radio device, a cellular telephone device, a computing device, a personal communication system device, or other like movable wireless communication equipped device, appliance, or machine. Any operable combination of the above are also considered a "mobile device."

The mobile device may communicate wirelessly with a plurality of wireless APs using RF signals (e.g., 2.4 GHz, 3.6 GHz, and 4.9/5.0 GHz bands) and standardized protocols for the modulation of the RF signals and the exchanging of information packets (e.g., IEEE 802.11x).

It should be appreciated that embodiments of the disclosure as will be hereinafter described may be implemented through the execution of instructions, for example as stored in the memory 205 or other element, by processor 201 of device and/or other circuitry of device and/or other devices. Particularly, circuitry of device, including but not limited to processor 201, may operate under the control of a program, routine, or the execution of instructions to execute methods or processes in accordance with embodiments of the disclosure. For example, such a program may be implemented in firmware or software (e.g. stored in memory 205 and/or other locations) and may be implemented by processors, such as processor 201, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 225 or network interface 210 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 2 may be omitted from the device 200. For example, one or more of the sensors 230-265 may be omitted in some embodiments.

Figure 3:
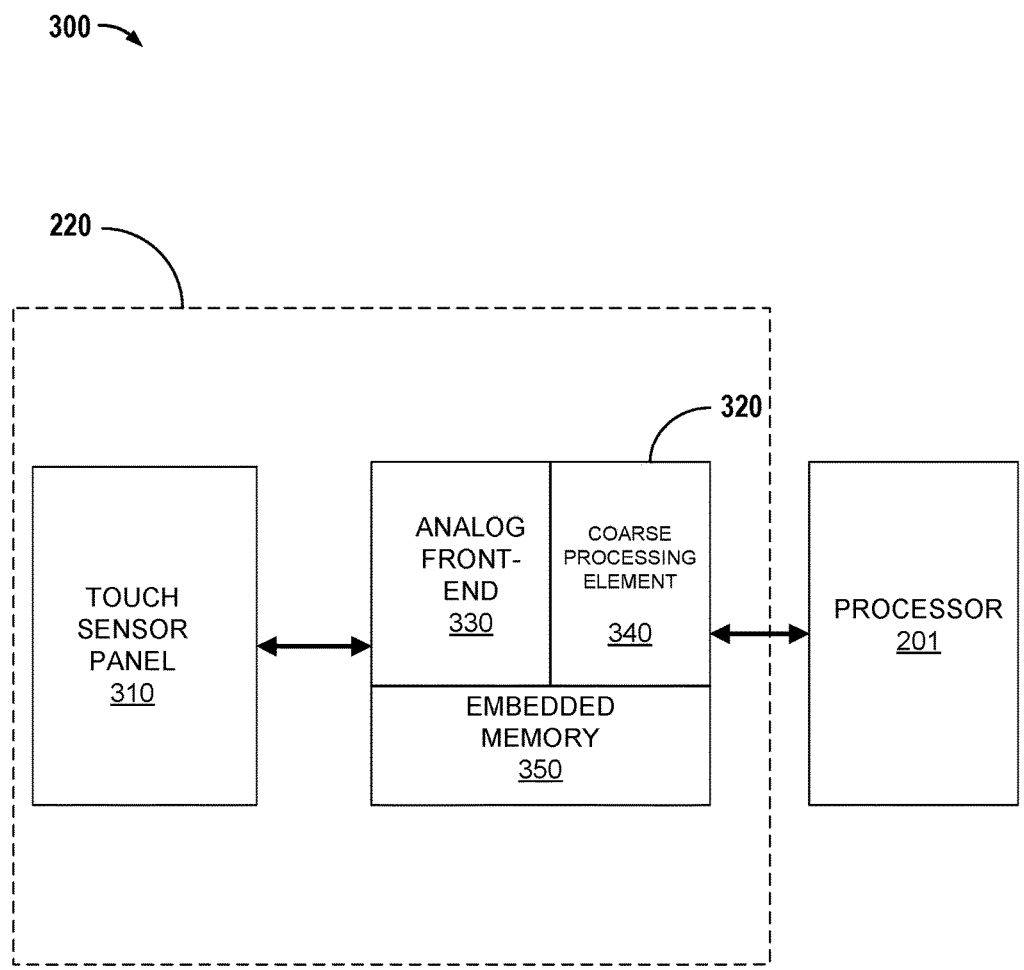
FIG. 3 is a block diagram illustrating various example components that may be utilized in connection with embodiments of the disclosure.

Referring to FIG. 3, a block diagram 300 illustrating various example components that may be utilized in connection with embodiments of the disclosure is shown. The touchscreen 220 of FIG. 2 is connected to the processor 201 of FIG. 2 via a suitable interface, such as a Serial Peripheral Interface (SPI) bus. The touchscreen 220 further comprises a touch sensor panel 310 and a touch controller 320. Moreover, the touch controller 320 further comprises an AFE 330, a coarse processing element 340, and an embedded memory 350. The AFE 330 may be capable of generating raw touch image data based on electrical signals generated by the touch sensor panel 310 in response to detected touches thereto. The coarse processing element 340 may be capable of performing the coarse processing as described herein including, for example, generating sparse data. In one embodiment, the coarse processing element 340 may also be capable of estimating a probability that a gesture is being drawn by a user based on incoming raw touch image data and/or sparse data. In another embodiment, the coarse processing element 340 may also be capable of determining one of a stroke length, a curve, a finger presence, a finger size (area, volume, eccentricity, etc.), etc. The touch controller 320 may transmit a signal to the processor 201 to wake the processor 201 up when the processor 201 is in a sleep mode, and then transmit sparse data and new touch image data to the processor 201.

Therefore, one embodiment of the disclosure is related to a touch controller 320 for use in a device 200 having a processor 201 and a touch sensor panel 310, the touch controller 320 being coupled to the processor 201 and the touch sensor panel 310, and further comprising: an analog front-end (AFE) 330, wherein the AFE 330 is configured to generate raw touch image data based on electrical signals generated by the touch sensor panel 310 in response to one or more detected touches thereto; a coarse processing element 340 configured to, in response to the processor 201 being set to a sleep mode, coarsely process the raw touch image data to generate sparse data; and an embedded memory 350 configured to store at least the sparse data, wherein the touch controller 320 is configured to transmit a signal to the processor 201 to wake the processor 201 up and transmit the stored sparse data and new touch image data to the processor 201, wherein the processor 201 performs gesture recognition based on the sparse data and the new touch image data.

Figure 4:
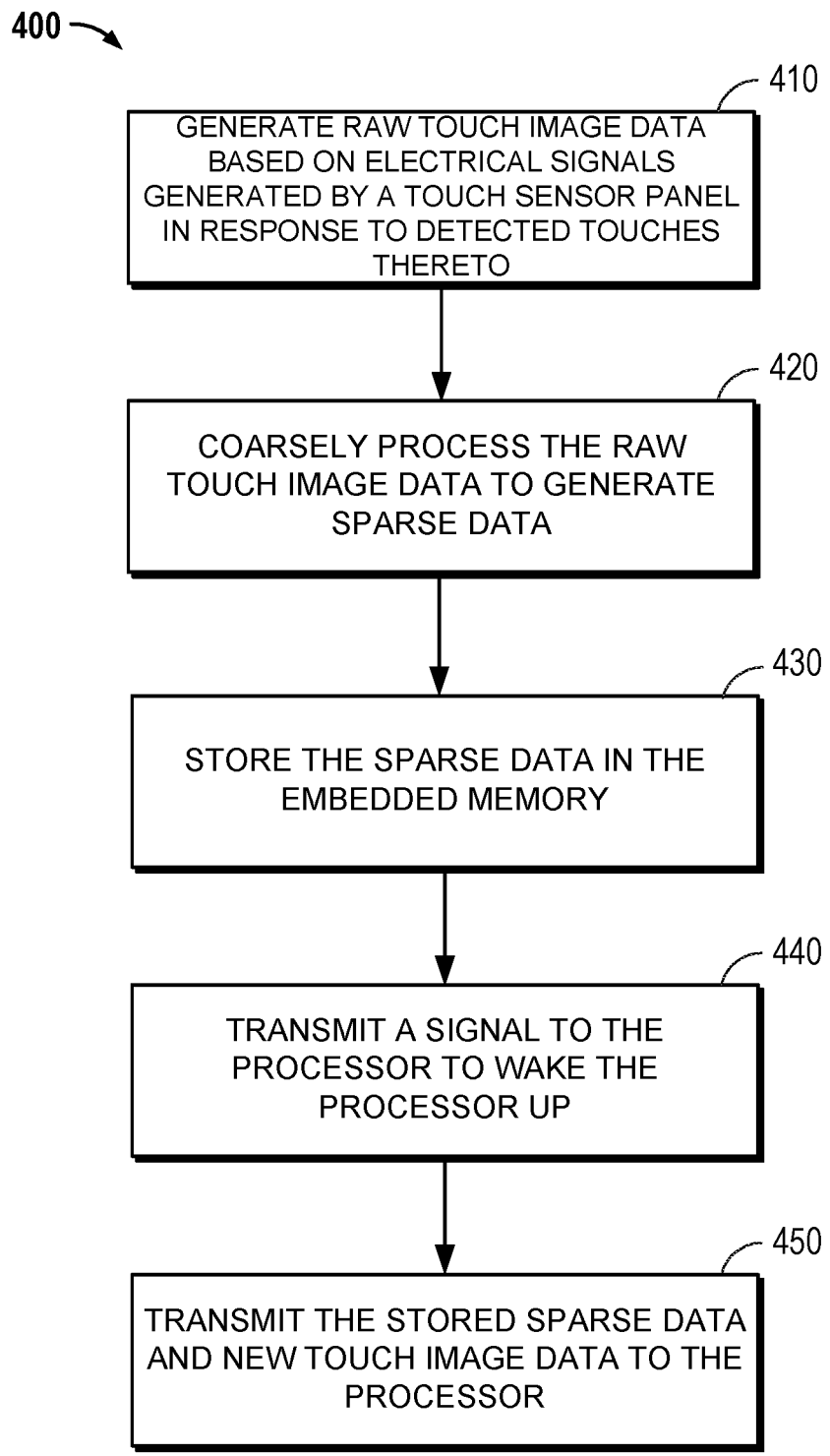
FIG. 4 is a flowchart illustrating an example method for coarsely processing raw touch image data with a touch controller.

Referring to FIG. 4, a flowchart illustrating an example method 400 for coarsely processing raw touch image data with a touch controller is shown. The method may be implemented at a touch controller 320. At block 410, raw touch image data may be generated at an AFE based on electrical signals generated a touch sensor panel in response to one or more detected touches thereto. At block 420, in response to a processor being set to a sleep mode, the processor being coupled to the touch controller, the raw touch image data may be coarsely processed at the coarse processing element to generate sparse data. At block 430, the sparse data may be stored in the embedded memory. At block 440, a signal may be transmitted to the processor to wake the processor up. And at block 450, the stored sparse data and new touch image data may be transmitted to the processor, wherein the processor may perform gesture recognition based on the received sparse data and the new touch image data.

Figure 5:
FIG. 5 is an example diagram illustrating a combination of sparse data and new touch image data.

Referring to FIG. 5, an example diagram 500 illustrating a combination of sparse data and new raw touch image data is shown. As can be seen, the gesture is the lower-case letter "g." The sparse data is shown as discrete dots in the upper half of the gesture, and the new raw touch image data is shown as a contiguous curve in the lower half of the gesture. Thanks to the sparse data, the likelihood that the gesture is correctly recognized is greatly increased.

Figure 6:
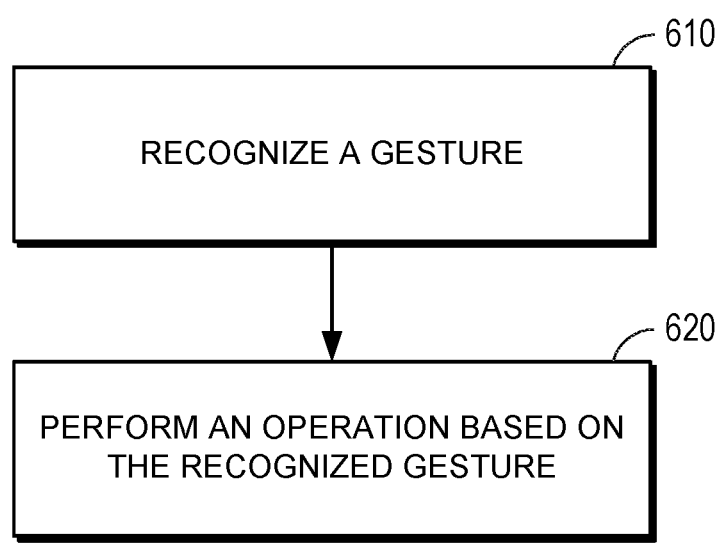
FIG. 6 is a flowchart illustrating an example method for performing an operation based on a detected gesture.

Referring to FIG. 6, a flowchart illustrating an example method 600 for performing an operation based on a detected gesture is shown. The user may predefine (input, enter, train, etc.) gestures that, when detected at the touchscreen, cause the device 200 to perform an operation. The operation may include waking up, unlocking, and/or performing a particular predefined task (e.g., launching a particular program/application), etc. Multiple gestures may be defined, and each gesture may be associated with a particular operation (e.g., wake up, unlock, perform a task, etc.). A gesture may be as simple as a letter drawn on the touchscreen. At block 610, a gesture may be recognized. As described above, the processor 201 of the device 200 may detect/recognize gestures based on touch image data and/or sparse data received from the touch controller 320. At block 620, an operation may be performed based on the recognized gesture. The operation may be, for example, waking up the processor 201/device 200, unlocking the device 200, performing a particular predefined task (e.g., launching a particular program/application), etc.

Therefore, by utilizing embodiments of the disclosure, raw touch image data may be coarsely processed at the touch controller to generate sparse data in response to the processor being set to a sleep mode. Because the sparse data is small in size compared to the corresponding raw touch image data, storing the sparse data in the embedded memory of the touch controller as opposed to the raw touch image frames allows for the storing of data that corresponds to a longer period of time, without an increase in the size of the embedded memory. Therefore, storing the sparse data in the embedded memory of the touch controller allows for delayed waking up of the processor, thereby preserving battery energy. Moreover, because the sparse data can be utilized by the processor to at least partially reconstruct the portions of a potential gesture that were drawn before the waking up of the processor, the decrease in gesture recognition accuracy as a result of the lost raw touch image data can be minimized. This improvement in gesture recognition accuracy may also help provide better security (e.g., when "touch to wake" is used to unlock a device).

It should be appreciated that aspects of the disclosure previously described may be implemented in conjunction with the execution of instructions (e.g., applications) by processor 201 of computing device 200, or by the touch controller 320 of the touchscreen 220, as previously described. Particularly, circuitry of the device, including but not limited to processor, may operate under the control of an application, program, routine, or the execution of instructions to execute methods or processes in accordance with embodiments of the disclosure (e.g., the processes of FIGS. 4 and 6). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

Methods described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeroes). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A touch controller for use in a device having a processor and a touch sensor panel, the touch controller being coupled to the processor and the touch sensor panel, and further comprising:
    an analog front-end (AFE), wherein the AFE is configured to generate raw touch image data based on electrical signals generated by the touch sensor panel in response to one or more detected touches thereto;
    a coarse processing element configured to, in response to the processor being set to a sleep mode, coarsely process the raw touch image data to generate sparse data and configured to estimate a probability that the raw touch image data is representative of a gesture drawn by a user; and
    an embedded memory configured to store at least the sparse data,
wherein the touch controller is configured to transmit a signal to the processor to wake the processor up and transmit the stored sparse data and new touch image data to the processor,
wherein the processor performs gesture recognition based on the sparse data and the new touch image data.

2. The touch controller of claim 1, wherein the new touch image data is new raw touch image data.

3. The touch controller of claim 1, wherein the sparse data comprises at least two-dimensional coordinates with associated identifiers.

4. The touch controller of claim 1, wherein the sparse data comprises locations of touch blobs.

5. The touch controller of claim 1, wherein the coarse processing element estimates the probability that the raw touch image data is representative of a gesture drawn by a user based on one or more of: a curvature of a touch segment, a length of a touch segment, a location of a touch, a duration of a touch, a fractal dimension of captured signals, or any combination thereof.

6. The touch controller of claim 1, wherein the transmitting of the signal to the processor to wake the processor up is in response to an estimated probability that the raw touch image data is representative of a gesture drawn by a user being above a predetermined threshold.

7. The touch controller of claim 1, wherein the coarse processing element is further to determine one of a stroke length, a curve, a finger presence, or a finger size.

8. The touch controller of claim 1, wherein the stored sparse data indicates at least (A) a plurality of locations from the raw touch image data or (B) a relation among a plurality of locations from the raw touch image data.

9. A method for coarsely processing raw touch image data, comprising:
generating at an analog front-end (AFE) of a touch controller raw touch image data based on electrical signals generated by a touch sensor panel in response to one or more detected touches thereto;
in response to a processor being set to a sleep mode, coarsely processing the raw touch image data at a coarse processing element of the touch controller to generate sparse data;
at the coarse processing element of the touch controller, estimating a probability that the raw touch image data is representative of a gesture drawn by a user;
storing the sparse data in an embedded memory of the touch controller;
transmitting a signal to the processor to wake the processor up; and
transmitting the stored sparse data and new touch image data to the processor,
wherein the processor performs gesture recognition based on the sparse data and the new touch image data.

10. The method of claim 9, wherein the new touch image data is new raw touch image data.

11. The method of claim 9, wherein the sparse data comprises at least two-dimensional coordinates with associated identifiers.

12. The method of claim 9, wherein the sparse data comprises locations of touch blobs.

13. The method of claim 9, wherein the estimating of the probability that the raw touch image data is representative of a gesture drawn by a user is based on one or more of: a curvature of a touch segment, a length of a touch segment, a location of a touch, a duration of a touch, a fractal dimension of captured signals, or any combination thereof.

14. The method of claim 9, wherein the transmitting of the signal to the processor to wake the processor up is in response to an estimated probability that the raw touch image data is representative of a gesture drawn by a user being above a predetermined threshold.

15. The method of claim 9, further comprising determining one of a stroke length, a curve, a finger presence, or a finger size.

16. The method of claim 9, wherein the stored sparse data indicates at least (A) a plurality of locations from the raw touch image data or (B) a relation among a plurality of locations from the raw touch image data.

17. An apparatus for coarsely processing raw touch image data, comprising:
means for generating raw touch image data based on electrical signals generated by a touch sensor panel in response to one or more detected touches thereto;
means for, in response to a processor being set to a sleep mode, coarsely processing the raw touch image data to generate sparse data and for estimating a probability that the raw touch image data is representative of a gesture drawn by a user;
means for storing the sparse data in an embedded memory of the touch controller;
means for transmitting a signal to the processor to wake the processor up; and
means for transmitting the stored sparse data and new touch image data to the processor, wherein the processor performs gesture recognition based on the sparse data and the new touch image data.

18. The apparatus of claim 17, wherein the new touch image data is new raw touch image data.

19. The apparatus of claim 17, wherein the sparse data comprises at least two-dimensional coordinates with associated identifiers.

20. The apparatus of claim 17, wherein the sparse data comprises locations of touch blobs.

21. The apparatus of claim 17, wherein the estimating of the probability that the raw touch image data is representative of a gesture drawn by a user is based on one or more of: a curvature of a touch segment, a length of a touch segment, a location of a touch, a duration of a touch, a fractal dimension of captured signals, or any combination thereof.

22. The apparatus of claim 17, wherein the transmitting of the signal to the processor to wake the processor up is in response to an estimated probability that the raw touch image data is representative of a gesture drawn by a user being above a predetermined threshold.

23. The apparatus of claim 17, wherein the stored sparse data indicates at least (A) a plurality of locations from the raw touch image data or (B) a relation among a plurality of locations from the raw touch image data.

24. A non-transitory computer-readable medium comprising code which, when executed by a processor, causes the processor to perform a method comprising:
generating at an analog front-end (AFE) of a touch controller raw touch image data based on electrical signals generated by a touch sensor panel in response to one or more detected touches thereto;
in response to a processor being set to a sleep mode, coarsely processing the raw touch image data at a coarse processing element of the touch controller to generate sparse data;
at the coarse processing element of the touch controller, estimating a probability that the raw touch image data is representative of a gesture drawn by a user;
storing the sparse data in an embedded memory of the touch controller;
transmitting a signal to the processor to wake the processor up; and
transmitting the stored sparse data and new touch image data to the processor,
wherein the processor performs gesture recognition based on the sparse data and the new touch image data.

25. The non-transitory computer-readable medium of claim 24, wherein the new touch image data is new raw touch image data.

26. The non-transitory computer-readable medium of claim 24, wherein the sparse data comprises at least two-dimensional coordinates with associated identifiers.

27. The non-transitory computer-readable medium of claim 24, wherein the sparse data comprises locations of touch blobs.

28. The non-transitory computer-readable medium of claim 24, wherein the estimating of the probability that the raw touch image data is representative of a gesture drawn by a user is based on one or more of: a curvature of a touch segment, a length of a touch segment, a location of a touch, a duration of a touch, a fractal dimension of captured signals, or any combination thereof.

29. The non-transitory computer-readable medium of claim 24, wherein the transmitting of the signal to the processor to wake the processor up is in response to an estimated probability that the raw touch image data is representative of a gesture drawn by a user being above a predetermined threshold.

30. The non-transitory computer-readable medium of claim 24, wherein the stored sparse data indicates at least (A) a plurality of locations from the raw touch image data or (B) a relation among a plurality of locations from the raw touch image data.

* * * * *